United States Patent [19]

Fischbach

[11] Patent Number: 5,353,475
[45] Date of Patent: Oct. 11, 1994

[54] HANDLE ATTACHMENT FOR COOKING UTENSILS OR THE LIKE

[75] Inventor: Wolfgang Fischbach, Daaden, Fed. Rep. of Germany

[73] Assignee: Heinrich Baumgarten KG Spezialfabrik fuer Beschlagteile, Neunkirchen, Fed. Rep. of Germany

[21] Appl. No.: 998,432

[22] Filed: Dec. 30, 1992

[30] Foreign Application Priority Data

Apr. 24, 1992 [DE] Fed. Rep. of Germany ... 9205573[U]

[51] Int. Cl.$^5$ ............................................. A47J 45/07
[52] U.S. Cl. .......................... 16/114 A; 16/DIG. 24; 403/6; 220/759; 29/426.5
[58] Field of Search .................. 29/426.5; 403/6; 16/114 A, 114 R, DIG. 24, DIG. 25, 125, DIG. 40, DIG. 41, 110 A; 30/340, 342; 220/759, 770

[56] References Cited

U.S. PATENT DOCUMENTS

| | | | |
|---|---|---|---|
| 711,912 | 10/1902 | Steudner | 29/426.5 |
| 1,577,708 | 3/1926 | Gallenkamp | 403/6 |
| 1,606,833 | 11/1926 | Grover | 16/114 A |
| 2,501,940 | 3/1950 | Hibbard | 16/114 A |
| 2,551,850 | 5/1951 | Quinn | 16/124 |
| 2,608,712 | 9/1952 | Seyforth | 16/125 |
| 3,487,495 | 1/1970 | Schultz, Jr. | 16/30 |
| 3,812,756 | 5/1974 | Wenger | 29/426.5 |
| 4,387,484 | 6/1983 | Fischbach | 16/114 A |
| 4,575,897 | 3/1986 | Fischbach | 16/DIG. 24 |
| 4,782,555 | 11/1988 | Fischbach | 16/114 A |

FOREIGN PATENT DOCUMENTS

| | | | |
|---|---|---|---|
| 222283 | 12/1961 | Austria . | |
| 2340723 | 2/1975 | Fed. Rep. of Germany ... | 16/110 A |
| 2553308 | 6/1977 | Fed. Rep. of Germany . | |
| 8604562 | 11/1986 | Fed. Rep. of Germany . | |
| 2041212A | 9/1980 | United Kingdom | 16/110 A |

Primary Examiner—Lowell A. Larson
Assistant Examiner—Donald M. Gurley
Attorney, Agent, or Firm—Flynn, Thiel, Boutell & Tanis

[57] ABSTRACT

A handle can be attached on a cooking pot, frying pan or the like frictionally and possibly also form-lockingly without a separate connecting element, wherein the fastened handle can be released from the rigid anchoring element on the cooking utensil. Through suitable openings in the handle attachment, a separating tool can be moved between two surfaces of the two fastening pieces which surfaces face one another and, with the help of the separating tool, a jerk-free release of the handle takes place. A conventional screwdriver can be used as the separating tool.

12 Claims, 3 Drawing Sheets

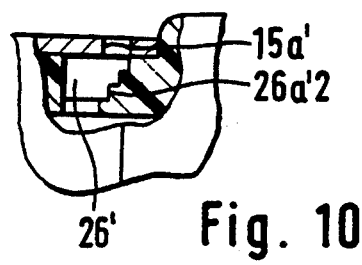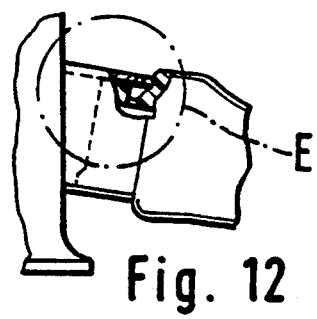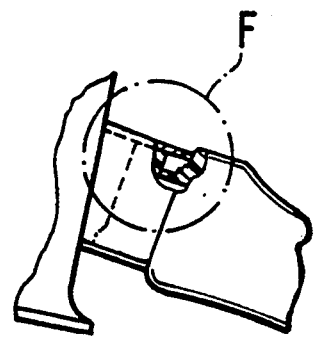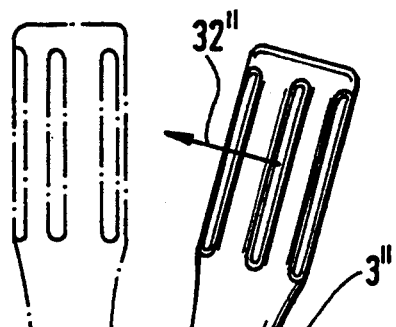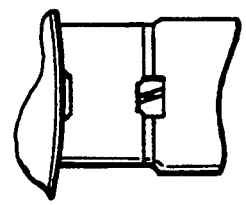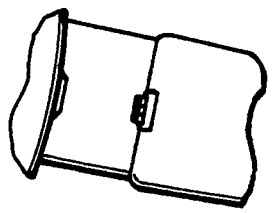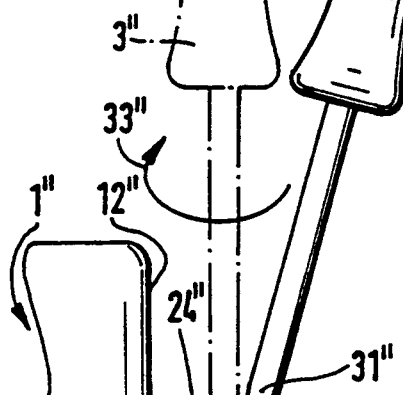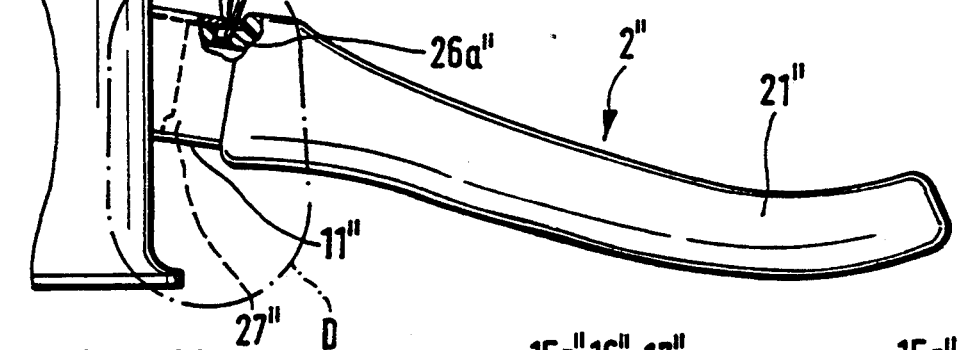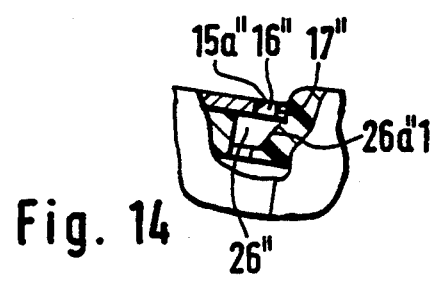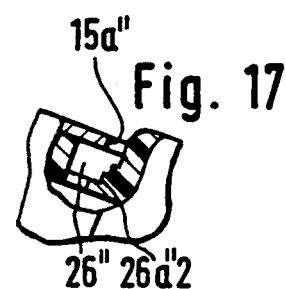

HANDLE ATTACHMENT FOR COOKING UTENSILS OR THE LIKE

FIELD OF THE INVENTION

The invention relates to a frictional and possibly form-locking handle attachment for a cooking utensil such as a cooking pot or frying pan, including a handle which serves as a first fastening piece and is connected to the cooking utensil by an anchoring element rigidly fastened on the cooking utensil and serving as a second fastening piece, and including a function element which is provided between the anchoring element and handle and which permits the handle to be moved relatively easily onto the anchoring element but to be removed only with great difficulty from the anchoring element.

BACKGROUND OF THE INVENTION

Such a handle attachment has the advantage that it can be produced quickly and easily by a manufacturer but is hardly capable of coming loose during use. This handle attachment is generally functional for long periods of time. It is used in particular for hollow side handles, for insertable side handles and for insertable straight handles when these are supposed to be connected to a cooking pot or a frying pan. All these handles have in common that a loose function element, such as a springy structural part, between the handle and an anchoring element riveted or welded on the cooking utensil ensures that the handle cannot be demounted after assembly or can be demounted only with a significant pull-off force when the handle attachment is a pure frictional connection- However, in this case it can with time also happen that the handle attachment becomes loose and is then no longer functional. It is therefore better if the connection also includes a form-locking part which continues to secure the handle even when it loosens slightly.

Such a rigid handle attachment, however, is not always advantageous. There are a number of cases where the handles must again be released. Thus, the cooking utensil may no longer be usable without discarding the handles attached thereto. In reverse, a handle may be defective while the cooking utensil is still usable, so that only the handle would have to be changed. It is also not practical to use a cooking utensil with loose handles. An incorrect connection may occur during assembly so that the parts must again be separated with great effort. Up to now it was necessary to accept any resulting damage because the needed separating tools could not sufficiently slowly and successively produce the high separating forces needed for a slightly rigid and simultaneously relatively sensitive cooking utensil.

A purpose of the invention is therefore, in a handle attachment of the type identified in detail above, to overcome the described deficiencies so that the handle attachment can be easily separated without damaging the connecting structural parts. The separating forces are supposed to be able to be applied essentially jerk-free. No additional structural parts are supposed to be needed, and the arrangement is supposed to be able to be manufactured easily and inexpensively and should be able to be operated with a simple separating tool.

SUMMARY OF THE INVENTION

According to the invention, this purpose is attained by providing recesses in the underside of the handle attachment and in an area in the fastening pieces in a manner so that two adjacent surfaces of the recesses which face one another, which are parallel to one another or only slightly inclined, which are slightly spaced from one another, and which extend approximately perpendicular to the directions for attaching or removing the handle are accessible from outside by a separating tool in a manner so that a pair of forces for releasing the handle attachment can be applied to these surfaces by the separating tool.

The described disadvantages of the state of the art are overcome in this surprisingly simple manner without losing an advantage of the known handle attachment, namely that the handle attachment can be easily installed but can be removed only with difficulty. In spite of this, a breakdown of the handle attachment will not occur during operation, because the user will rarely release the handle so long as the handle attachment is fully functional. However, if this is no longer the case, then on the other hand no technical knowledge is needed in order to bring about a separation of the handle from the cooking utensil.

It can be particularly simple when the surfaces are spaced from one another in such a manner that, as the separating tool, a lever (for example a screwdriver) having a high lever advantage can be utilized. Such a screwdriver exists in any household and requires little skill to apply the necessary torque sufficiently carefully so that the handle attachment is released slowly and steadily and thus damage to a structural part is avoided. The recesses for the tool are arranged so that direct engagement of the lever with the wall of the pot is avoided, and thus the damage associated therewith is avoided.

Depending on the construction, it can be advantageous if the recesses are slot-shaped or groove-shaped. No additional operations whatsoever are needed in either case during manufacture and assembly, except for a slight change on the cutting or extrusion die used for the manufacture of the respective structural part.

The invention can be used in many ways. Thus, it is possible to design the handle as a hollow side handle which has a handle piece and two arms and in which the anchoring elements are received within cavities in the two arms (a slot-shaped recess being provided in each of the arms), to design the handle as an insertable side handle which has a handle piece and two arms and is placed into a sheet metal sleeve serving as the stationary anchoring element on the cooking utensil and surrounding the arms (a respective slot-shaped recess being provided in the anchoring element in the area of arm of the handle and a groove-shaped recess being provided in each arm), or to design the handle as a straight insertable handle which has a handle piece and has a holding piece integral with the handle piece and placed into a sheet-metal sleeve serving as the anchoring element (a groove-shaped recess being provided in an edge of the anchoring element and/or in the holding piece, with the possibility of the recess being provided only in the anchoring element). The invention can thus be applied to all modern handle attachments of this type, without requiring a special separating tool. In an individual case, it may at most be necessary that the separating tool, after use as a lever, is in addition rotated about its axis in order to finally separate the already released handle attachment with only a little use of force.

It is particularly advantageous when a surface on the handle piece for engagement by the separating tool is offset in a steplike manner. However, it is sufficient in many cases if this surface is flat, namely if it is slightly inclined with respect to its corresponding surface on the other fastening piece. It is possible in this case to adjust the separating tool so that the separation is further simplified.

BRIEF DESCRIPTION OF THE DRAWINGS

Further advantages and greater details will be discussed hereinafter in connection with three exemplary embodiments shown in the drawings, in which:

FIG. 10 is a view similar to FIG. 9 but showing an alternative embodiment;

FIG. 11 is a diagrammatic side view of a further handle attachment according to the invention for an insertable handle, during separation;

FIG. 12 is an enlarged view of the portion "D" of FIG. 11;

FIG. 13 is a diagrammatic bottom view of the structure of FIG. 12;

FIG. 14 is an enlarged view of the portion "E" of FIG. 12;

FIG. 15 is a view similar to FIG. 12 but showing an alternative embodiment;

FIG. 16 is a diagrammatic bottom view of the structure of FIG. 15; and

FIG. 17 is an enlarged view of a portion "F" of FIG. 15.

DETAILED DESCRIPTION

Figure 1:
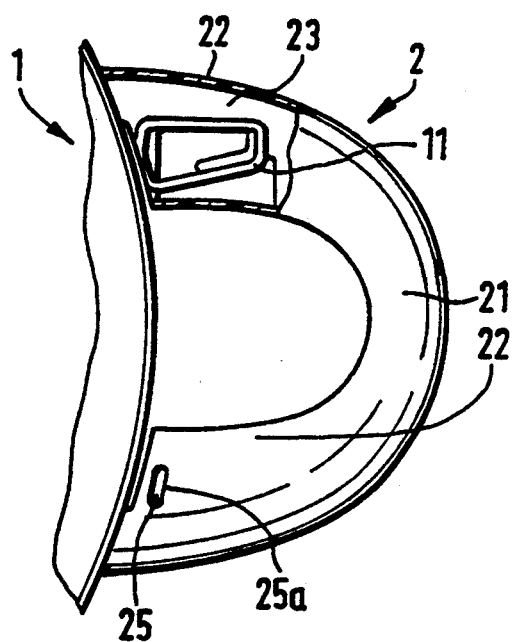
FIG. 1 is a diagrammatic bottom view of a handle attachment according to the invention for a hollow side handle, in an assembled state.
Figure 2:
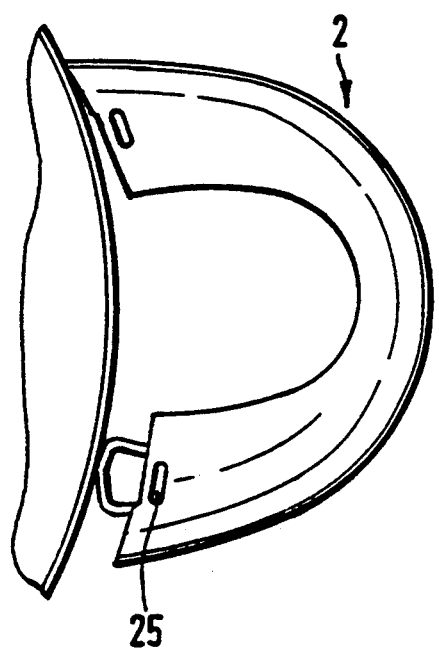
FIG. 2 is a diagrammatic view similar to FIG. 1 but showing one arm released.
Figure 3:
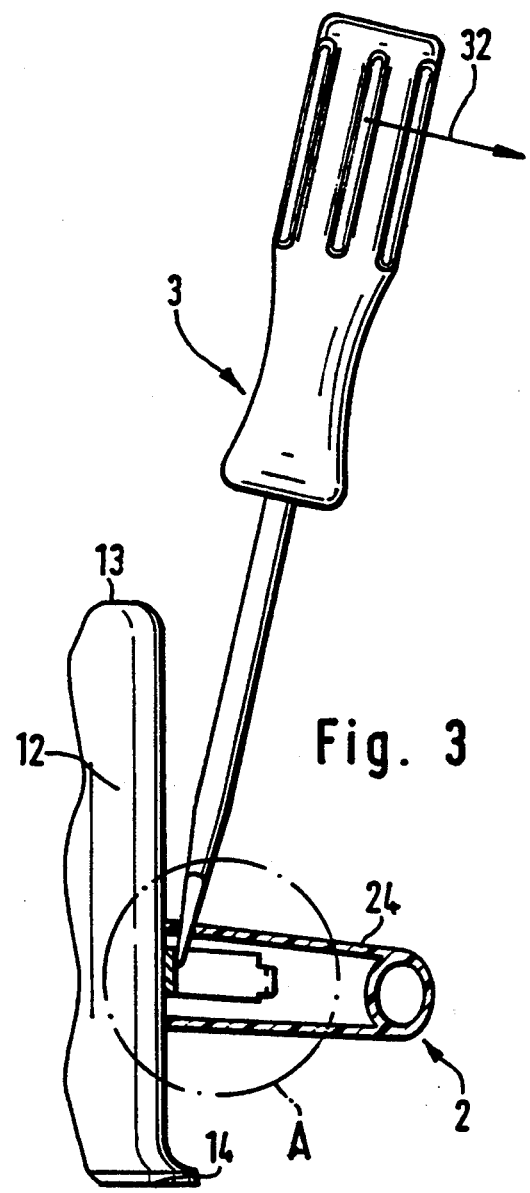
FIG. 3 is a diagrammatic side view of the handle of FIG. 1 during the separation of one arm.

A cooking utensil 1 is connected to a handle 2 which is a hollow side handle having a handle piece 21 and two arms 22 in a first exemplary embodiment shown in FIGS. 1 to 4. Each arm 22 has a cavity 23 which receives an anchoring element 11 fixedly mounted on the cooking utensil 1. The anchoring element 11 here is a type of a bar or bent metal strip which is fastened on a cylindrical wall 12 of the cooking utensil 1 by resistance spot welding or the like, as can be particularly seen in FIG. 3. In FIG. 3, one can also recognize a bottom 13 and a top edge 14 of the cooking utensil 1. A not-illustrated function element between each arm 22 and the anchoring element 11 takes care that the handle 2 can be easily moved onto the anchoring elements 11, but in reverse cannot easily leave them. Such function elements are generally parts with spring characteristics, which are commercially available in many designs and are known to the man skilled in the art. They are not illustrated mainly because they do not have a direct relationship with the invention.

Figure 4:
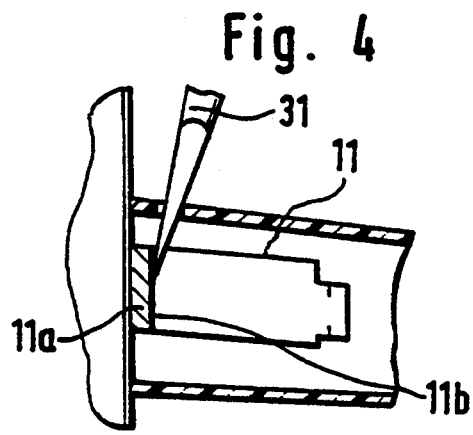
FIG. 4 is an enlarged view of the portion "A" of FIG. 3.

A recess or opening 25 is provided in each arm 22 on the underside 24 of the handle 2, opens into the cavity 23, and is slot-shaped as shown in FIGS. 1 and 2. FIG. 4 shows very clearly how, through the recess 25, the separation of the handle 2 from the anchoring element 11 can be carried out with the help of a separating tool 3. The anchoring element 11 has a plate 11a welded on the wall 12, and its surface 11b serves as an abutment for a blade 31 of the separating tool 3 so that the surface of the wall 12 is not used. The recess 25 is positioned so that its longitudinally extending surface 25a, which faces in a direction opposite the surface 11b, just permits the introduction of the blade 31. Thus, the separating tool 3 can apply a releasing torque onto the handle attachment, when it is operated in the direction of rotation shown by the arrow 32.

A second exemplary embodiment shown in FIGS. 5 to 10 shows the cooking utensil 1' connected to a handle 2' which is an insertable side handle having a handle piece 21' and two massive or hollow manufactured arms 22'. All parts are here identified with reference numerals having one prime, but the same reference numeral is used in the case of each part which is the same as or corresponds to a part in the first exemplary embodiment.

The anchoring element 11' is a sheet-metal sleeve which encloses a portion of the arms 22' on all sides and which is fixedly connected to the wall 12' of the cooking utensil 1. Spaced recesses 15' are provided in the anchoring element 11' on the underside 24' of the handle attachment in the region of the arms 22', are each slot-shaped, and are each associated with a recess 16' in the arms 22' which is groove-shaped.

Figure 5:
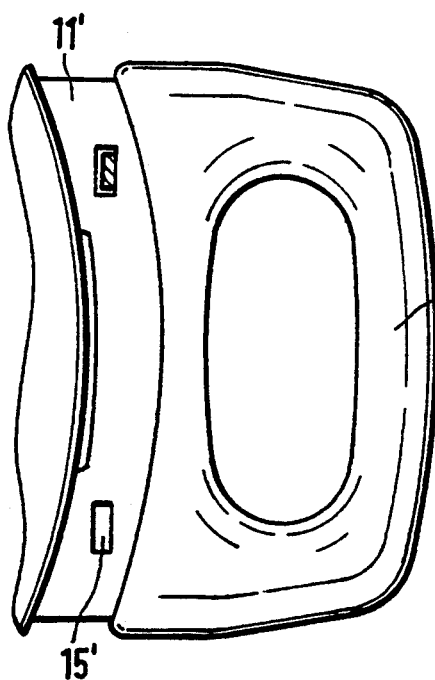
FIG. 5 is a diagrammatic bottom view of an alternative embodiment of a handle attachment according to the invention for an insertable side handle, in an assembled state.
Figure 7:
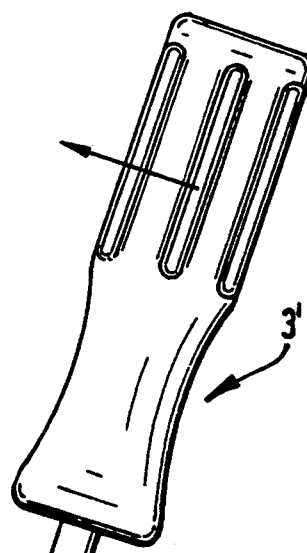
FIG. 7 is a diagrammatic side view of the handle of FIG. 5 during the separation of one arm.

Two corresponding surfaces 15a' in the recess 15' and 26a' in the recess 26' (FIGS. 9 and 10) are provided as abutments for a blade 31' of a separating tool 3' in order to produce a torque suitable for the release of the handle attachment, but the direction of tool rotation identified by the arrow 32' is opposite to that in the first exemplary embodiment. The surfaces 15' and 26a' are oriented in separate planes which extend transversely of a handle assembly axis. The surfaces can extend at an acute angle relative to one another as shown in FIG. 5, or extend generally parallel to each other as shown in FIG. 10

Figure 9:
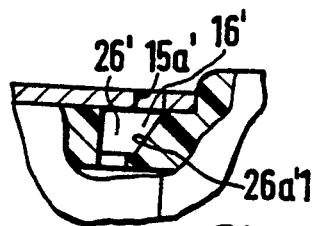
FIG. 9 is an enlarged view of the portion "C" of FIG. 8.
Figure 6:
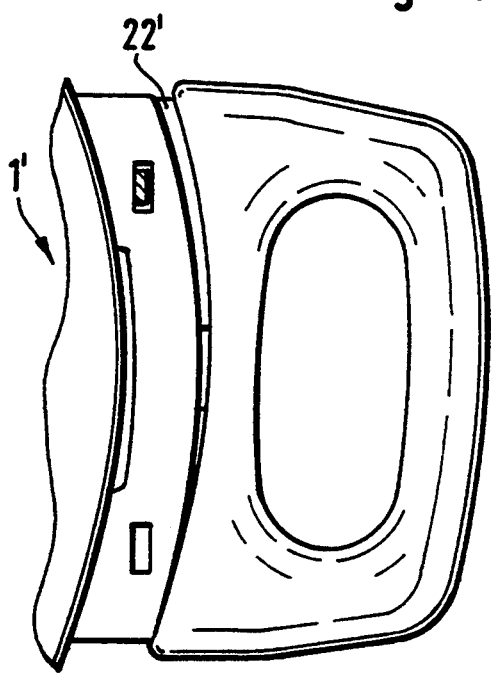
FIG. 6 is a diagrammatic view similar to FIG. 5 but showing one arm released.
Figure 8:
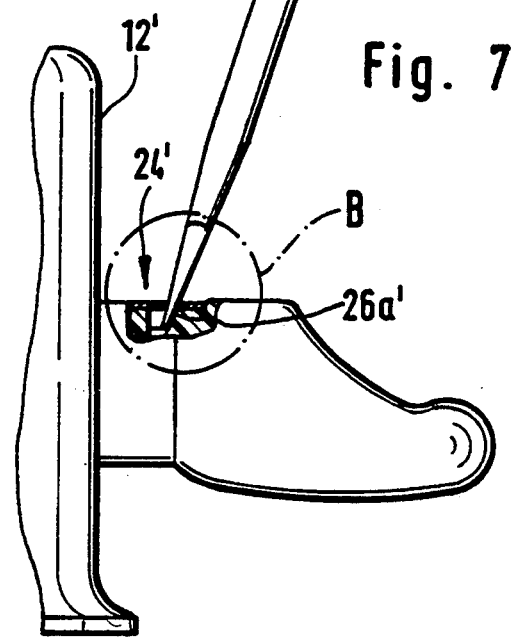
FIG. 8 is an enlarged view of the portion "B" of FIG. 7.
Figure 8:
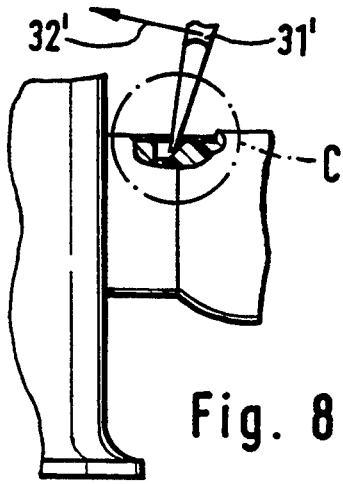

FIGS. 9 and 10 make it clear that the surfaces 26a' can be designed differently, in that the embodiment of FIG. 9 has a flat, inclined surface 26a'1, whereas the embodiment of FIG. 10 has a steplike offset surface 26a'2. The steplike offset surface 26a'2 has a plurality of stepped portions offset from the surface 15a'. Each stepped portion includes a radially extending wall generally parallel to the surface 15a', and an axially extending wall generally parallel to a side surface of the sleeve 11'. Other designs are conceivable.

A cooking utensil 1" in a third exemplary embodiment shown in FIGS. 11 to 17 is connected to a handle 2" which, as an insertable handle, has a handle piece 21" and a holding piece 27" provided in one piece on the handle piece 21". All parts are here marked with reference numerals having two primes, but the same reference numeral is used in the case of each part which is the same as or corresponds to a part in the two above-described exemplary embodiments.

A sheet-metal sleeve 11″ is again used as the anchoring element, encloses a holding piece 27″ on all sides, and is fixedly connected to the wall 12″ of the cooking utensil 1″. A slot-shaped recess 16″ is provided in an edge 17″ of the anchoring element 11″ which faces the handle 2″, and a groove-shaped recess 26″ is provided in a holding piece 27″ of the handle 2″. This situation corresponds approximately with that of the second exemplary embodiment, so that here too surfaces 15a″ and 26a″ are utilized as a fulcrum for transmitting a release moment applied by the blade 31″ of a separating tool 3″. A primary force applied to the separating tool moves from the separating tool through the sheet metal sleeve to apply a secondary force greater than the primary force to the surface 26″ to effect a release of the handle from the sleeve along the handle assembly axis. The surface 26″ can thereby be designed in a similar manner as a flat surface 26a″1 shown in FIG. 16 or a stepped surface 26a″2 shown in FIG. 17. FIG. 11 shows that the insertable handle can be released from the cooking utensil 1″ in two stages: the separating tool 3″ is first swivelled in the direction of the arrow 32″, and is thereafter turned (while in the position shown in dash-dotted lines) in the direction shown by the arrow 33″.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a handle assembly for a cooking utensil, such as a cooking pot or fry pan, which extends outwardly from the cooking utensil along a handle assembly axis, the handle assembly including a hollow sheet metal sleeve rigidly fastened to and extending from the cooking utensil along the axis, and handle having a first end portion extending coextensively with the sleeve and being positioned entirely within the sleeve, a function element positioned between the cooking utensil and the first end portion which releasably couples the handle to the utensil and which permits the handle to be relatively easily moved into engagement with the sleeve but can only be released with great difficulty from the sleeve, and at least one means for facilitating removal of the handle from the sleeve provided on a side of the handle assembly, the improvement wherein said means for facilitating removal of the handle from the sleeve comprises:

at least one first recess provided in a portion of a side surface of the sleeve and defining a first surface;

at least one second recess provided in the first end portion of the handle, said second recess being positioned radially inwardly of and axially underlying the at least one first recess relative to the handle assembly axis, said second recess defining a second surface which is axially and radially inwardly offset from the first surface relative to the handle assembly axis; and said first and second surfaces being oriented in separate planes which extend transversely of the handle assembly axis, each said first and second surfaces being accessible from outside the handle attachment by a separating tool in such a manner that a pair of forces effective for releasing the handle from the sleeve can be applied to the surfaces by the separating tool whereby the first surface serves as a metal fulcrum engaged by the separating tool so that a primary force applied to the separating tool moves from the separating tool through the sheet metal sleeve to apply a secondary force greater than said primary force to the second surface to thus effect a release of the handle from the sleeve along the handle assembly axis.

2. A handle attachment according to claim 1, wherein the surfaces are offset from one another in a manner so that the separating tool, in the form of a screwdriver blade, with a high lever advantage can be used.

3. A handle attachment according to claim 1, wherein the recesses are slot-shaped.

4. A handle attachment according to claim 1, wherein the recesses are groove-shaped.

5. A handle attachment according to claim 1, wherein the second surface is offset from the first surface in a step-like manner.

6. A handle attachment according to claim 1, wherein the second surface is flat.

7. A handle attachment according to claim 1, wherein the handle is an insertable side handle which includes a handle piece and two arms, each arm having a first end portion positioned within the sheet metal sleeve, and wherein the handle assembly includes two first recesses provided in a portion of a side surface of the sleeve, and the second recess being provided in each arm of the handle.

8. A handle attachment according to claim 1, wherein the handle is a straight insertable handle having a handle piece extending from the first end portion, and wherein the handle assembly includes one first recess provided in a portion of a side surface of the sleeve, and one second recess being provided in the first end portion of the handle.

9. A handle attachment according to claim 1, wherein the second surface extends at an acute angle relative to the first surface.

10. A handle attachment according to claim 1, wherein the second surface defines a plurality of stepped portions offset from the first surface, each stepped portion including a radially extending wall generally parallel to the first surface, and an axially extending wall generally parallel to the side surface of the sleeve.

11. A handle attachment according to claim 1, wherein the at least one first recess is a slot spaced axially from a free edge of the sheet metal sleeve adjacent the handle, the slot being bounded on all sides thereof by metal edges.

12. A handle attachment according to claim 1, wherein the at least one first recess is a notch positioned along a free edge of the sheet metal sleeve.

* * * * *

UNITED STATES PATENT AND TRADEMARK OFFICE
CERTIFICATE OF CORRECTION

PATENT NO. : 5 353 475
DATED : October 11, 1994
INVENTOR(S) : Wolfgang FISCHBACH It is certified that error appears in the above-indentified patent and that said Letters Patent is hereby corrected as shown below:

Column 5, line 40; change "and" to ---a---.

Signed and Sealed this

Seventh Day of March, 1995

Attest:

BRUCE LEHMAN

*Attesting Officer*   *Commissioner of Patents and Trademarks*